United States Patent [19]

Kanayama

[11] Patent Number: 4,855,760
[45] Date of Patent: Aug. 8, 1989

[54] LED ARRAY WITH GRADUATED QUANTITY CONTROL

[75] Inventor: Toshikiyo Kanayama, Kanagawa, Japan

[73] Assignee: Fuji Photo Film Co., Ltd., Kanagawa, Japan

[21] Appl. No.: 167,283

[22] Filed: Mar. 11, 1988

[30] Foreign Application Priority Data

Mar. 12, 1987 [JP] Japan .................................. 62-55245
Mar. 13, 1987 [JP] Japan .................................. 62-56889
Mar. 20, 1987 [JP] Japan .................................. 62-64293

[51] Int. Cl.$^4$ ............................................. G01D 9/42
[52] U.S. Cl. .................................... 346/108; 358/296; 358/456; 346/107 R
[58] Field of Search ................... 346/108, 107 R, 160; 358/283, 284, 285, 293, 294, 296, 298, 300, 302

[56] References Cited

U.S. PATENT DOCUMENTS

4,750,010  6/1988  Ayers ............................ 346/107 R
4,757,327  7/1988  Henzi ............................ 346/107 R

*Primary Examiner*—E. A. Goldberg
*Assistant Examiner*—Mark Reinhart
*Attorney, Agent, or Firm*—Sughrue, Mion, Zinn, MacPeak & Seas

[57] ABSTRACT

An image forming method and apparatus characterized in that current supply periods of time to light-emitting diodes constituting a light-emitting diode arrays are controlled corresponding to gradation levels while a constant current is being supplied to the light-emitting diodes, and in that the current supply period of time is adjusted at every gradation level corresponding to the variations in light intensity of the light-emitting diodes when the constant current is supplied to thereby correct for the variations in output light intensities of the light-emitting diodes.

3 Claims, 8 Drawing Sheets

LED ARRAY WITH GRADUATED QUANTITY CONTROL

BACKGROUND OF THE INVENTION

The present invention relates to an image forming an method for forming image on a light-sensitive material by use of a light-emitting diode array as a point-light source. More particularly, the invention relates to an image forming method for forming half-tone images on a light-sensitive material by gradation-controlling a light-emitting diode array.

Heretofore, a half-tone image (latent image) has been formed on a light-sensitive material, such as silver-salt film or the like, by exposing the light-sensitive material to light emitted from a light-emitting diode array composed of tiny light-emitting diodes arranged in a line by controlling the output intensities of the respective light-emitting diodes while the light-sensitive material is being moved relative to the direction perpendicular to the lengthwise direction of the light-emitting diode array. Specifically, a half-tone image is formed by changing the output light intensity by controlling the currents supplied to the respective light-emitting diodes.

Figure 1:
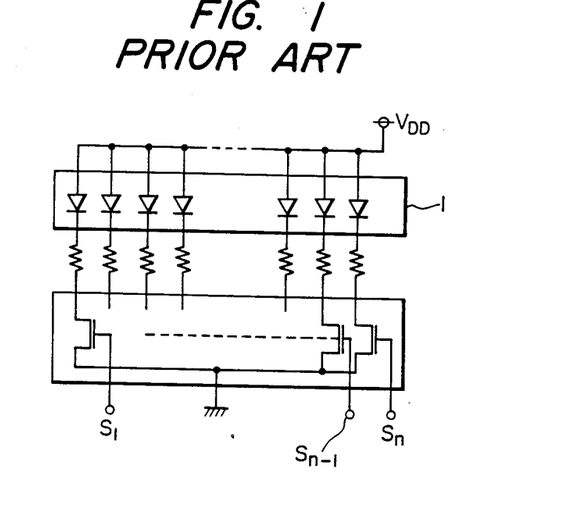
FIGS. 1 and 2 are circuit diagrams used for explaining gradation control in the conventional image forming method.
Figure 2:
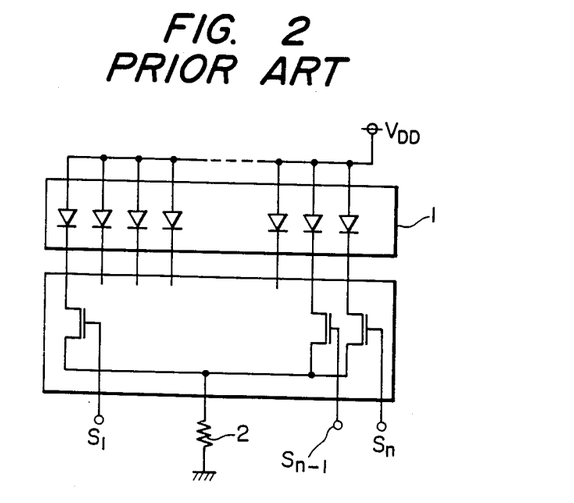

However, the individual light-emitting diodes have different current-intensity characteristics from each other. Therefore, such a current supply circuit as shown in FIG. 1 or FIG. 2 has been used. In the circuit as shown in FIG. 1, a light-emitting diode array 1 is connected between an electric source $V_{DD}$ and a ground terminal so as to apply a forward bias thereto. Specifically, the cathodes of the respective light-emitting diodes are connected commonly to the ground terminal via resistors and transistors. Control signals $S_1$ to $S_n$ corresponding to the recording gradation are applied to the respective transistors to thereby control the light-emitting intensities of the respective light-emitting diodes independently of each other. In order to keep the characteristics of the light-emitting diodes uniform, the respective resistors are adjusted to pass an equal current through each light-emitting diode when the control signals $S_1$ to $S_n$ are at the same level. In the circuit of FIG. 2, a light-emitting diode array 1 is connected between an electric source $V_{DD}$ and a ground terminal to apply a forward bias. Specifically, transistors are connected between respective ones of the light-emitting diodes and ground through a common resistor 2 so that substantially uniform characteristic are attained for the respective light-emitting diodes.

However, the following problems still exist in the image forming method using such a compensation technique as described above.

In the prior art as shown in FIG. 1, it is very troublesome to adjust the resistors when the light-emitting diodes are large in number. Accordingly, the technique is unsuited for the formation of a high-resolution image. Recent techniques such as laser trimming, used in the field of semiconductor integrated circuits or the like, are very difficult to apply in practice. In the prior art as shown in FIG. 2, it is difficult to form a high-precision image because of the nonlinear current-intensity characteristics of the light-emitting diodes and because of the variations in characteristics of the light-emitting diodes. In addition, the aforementioned conventional apparatus has a problem in that gradation gaps may be recognized by the human eye because the concentration change of the light-sensitive material can not be maintained constant.

SUMMARY OF THE INVENTION

Under such circumstances, it is an object of the present invention to provide an image forming method which is simple to implement and with which high-precision gradation control can be effected to solve the aforementioned problems caused by the variations in the light-emitting intensities of the light-emitting diodes.

In order to attain the above and other objects, the invention is characterized in that the quantity of light received on the light-sensitive material in a predetermined period is controlled by changing the light-emitting time periods of the respective light-emitting diodes while the output light intensities of the light-emitting diodes are kept constant when the light-emitting diodes are driven, thereby controlling gradation.

Further, in order to attain the above and other objects, the invention is characterized in that the current supply time periods to the respective light-emitting diodes are controlled corresponding to the gradation levels while a constant current is supplied to the light-emitting diodes of light-emitting diode array, and in that the current supply time periods are adjusted at every gradation level corresponding to the variations in output light intensity of the light-emitting diodes when the constant current is supplied to the light-emitting diodes, thereby correcting the variation in light output intensity of the light-emitting diodes.

A further object of the invention is to provide an image forming method in which the light-emitting time periods are controlled at every gradation to maintain the concentration change of the light-sensitive material constant or so as to be unrecognizable by the human eye to thereby attain excellent gradation control.

DESCRIPTION OF THE PREFERRED EMBODIMENTS

The image forming method of the present invention will be described with respect to preferred embodiments thereof and in connection with the drawings.

Figure 3:
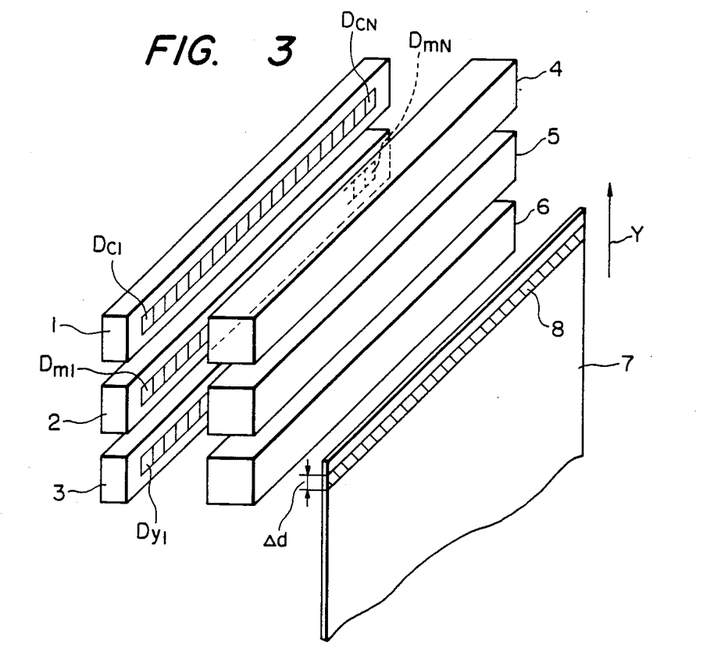
FIG. 3 is a schematic view showing a first embodiment of an image forming apparatus based on the image forming method according to the present invention.

Referring now to FIG. 3, there is schematically shown the construction of an image forming apparatus using a light-emitting diode arrays as a light source. In the drawings, reference numeral 1 designates a light-emitting array emitting cyan light having a wavelength $\lambda_1$ of about 815 nm, reference numeral 2 designates a light-emitting diode arrays emitting magenta light having a wavelength $\lambda_2$ of about 665 nm, and reference numeral 3 designates a light-emitting diode array emitting yellow light having a wavelength $\lambda_3$ of about 570 nm. The light-emitting diode arrays 1, 2, and 3 have respective groups of very small light-emitting diodes $D_{c1}$ to $D_{cN}$, $D_{m1}$ to $D_{mN}$, and $D_{y1}$ to $D_{yN}$, which are arranged serially in the longitudinal direction. The respective light-emitting diode groups are arranged parallel to each other in the longitudinal direction and at a regular pitch facing a light-sensitive material such as silver-salt film or the like, as will be described below.

Reference numerals 4, 5 and 6 designate SELFOC (self-focusing) lenses which face the light-emitting diode arrays 1, 2 and 3, respectively. Reference numeral 7 designates a light-sensitive material such as silver-salt film or the like. Being moved in the direction the arrow Y at a constant speed, the light-sensitive material 7 is irradiated line by line with light emitted from the light-emitting diode arrays 1, 2 and 3 through the SELFOC lenses 4, 5 and 6, respectively.

More particularly, with respect to a portion 8 (shown by a hatched area in the drawings), while the light-sensitive material 7 is being moved in the Y-direction, first, light from the light-emitting diode array 3, suceedingly, light from the light-emitting diode array 2, and finally, light from the light-emitting diode array 1 are successively irradiated onto the light-sensitive material 7 with the same width of Δd. As described above, by irradiation with light of the three wave lengths $\lambda_1$, $\lambda_2$ and $\lambda_3$, an image can be formed on the portion 8 of the light-sensitive material 7. Accordingly, by repeating such a procedure while moving the light-sensitive material. an image (color latent image) of one frame can be formed.

Figure 4:
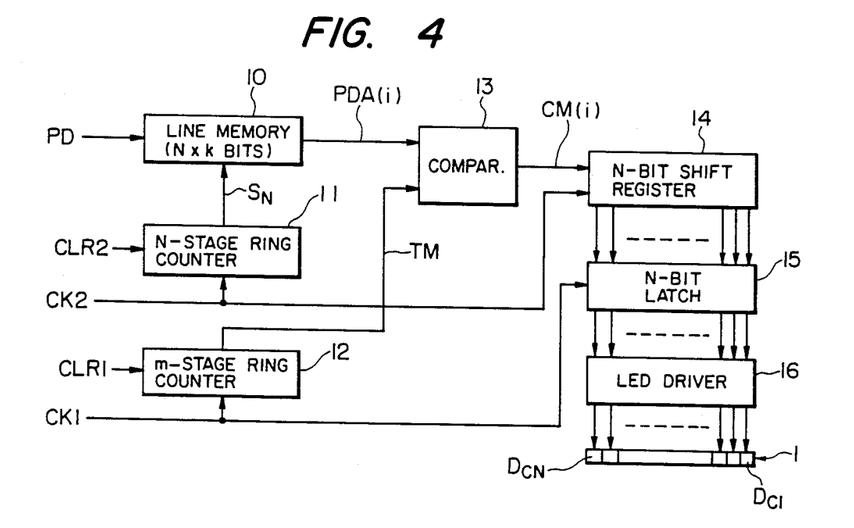
FIG. 4 is a block diagram showing a control circuit for controlling a light-emitting diode array provided in the image forming apparatus.

The diodes $D_{c1}$ to $D_{cN}$, $D_{m1}$ to $D_{mN}$ and $D_{y1}$ to $D_{yN}$, of the respective light-emitting diode arrays 1, 2 and 3 are each controlled by a control circuit as shown in FIG. 4. Although FIG. 4 shows one control circuit for controlling the light-emitting diode arrays 1, each of the other light-emitting diode arrays 2 and 3 is controlled by a similar control circuit.

In FIG. 4, reference numeral 10 designates a line memory having storage addresses which are N in number, each being provided for storing k bits, so that binary-coded gradation data PDA(1) to PDA(N) can be stored at the respective N storage addresses. Of course, $2^k$ gradation levels can be determined by one gradation data.

Reference numeral 11 designates an N-stage ring counter for counting pulses of a clock signal CK2, by which a count data $S_N$, as an address signal, is applied to the line memory 10 to thereby read a gradation datum PD(i) from the designated address i.

Reference numeral 12 designates a k-ary ring counter for counting a clock signal CK1 to thereby generate a count datum TM which changes within a range of 0 to $2^k-1$. The period of the clock signal CK2 is set to 1/N times as long as the period of the clock signal CK1 (or in other words, the period of the clock signal CK1 is set to several-tenths times as long as the period of the light-emitting diode output).

Reference numeral 13 designates a comparator for comparing the gradation datum PDA(i) with the count datum TM. If PDA(i)≧TM, a logical output CM(i) of "1" is generated by the comparator 13, and on the contrary, if PDA(i)<TM, a logical output CM(i) of "0" is generated.

Reference numeral 14 designates an N-bit shift register for successively holding the logical output CM(i) fed in synchronism with the clock signal CK2.

Reference numeral 15 designates a latch circuit for latching the N-bit logical data CM(1) to CM(N) stored in the shift register 14 in synchronism with the clock signal CK1. More particularly, as described above, the two clock signals CK1 and CK2 have a relation such that one pulse of the clock signal CK1 is generated whenever N pulses of the clock signal CK2 are generated. Accordingly, after all gradation data PDA(1) to PDA(N) read from the line memory 10 are compared with the count datum TM, the logical data CM(1) to CM(N) are latched as the result of the aforementioned comparison.

Reference numeral 16 designates an LED driver for applying a driving current to each of the light-emitting diodes $D_{c1}$ to $D_{cN}$ based on the logical data stored in the respective bits of the latch circuit 15. For example, when the logical output DM(i) of a certain i is "1", a constant current is applied to a corresponding light-emitting diode DCi. On the contrary, when the logical output DM(i) of the certain i is "0", no current is applied to a corresponding light-emitting diode DCi.

In the following, the operation of the aforementioned control circuit is described with reference to the timing chart of FIG. 5. For the sake of convenience, the case where the gradation data is within a range of from 0 to 3 is described, or in other words, the case where k (number of bits) is 2 is described.

Figure 5A:
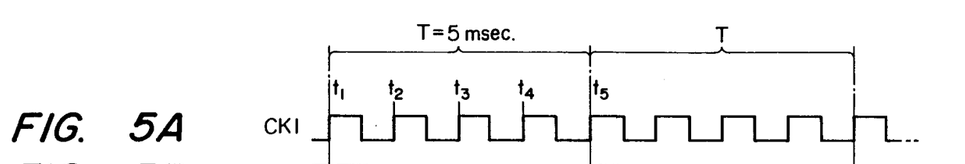
FIGS. 5A to 5I are a timing chart for explaining the operation of the control circuit of FIG. 4.
Figure 5B:
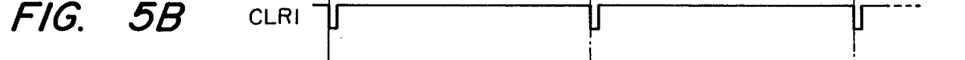
Figure 5C:
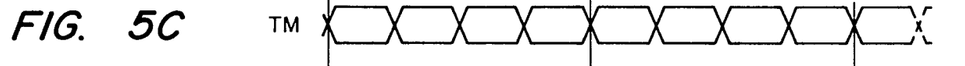
Figure 5D:
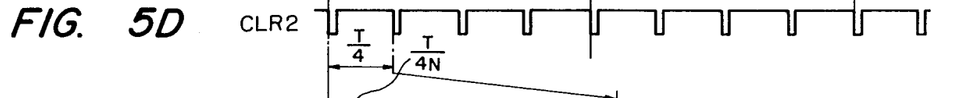
Figures 5E, 5F:
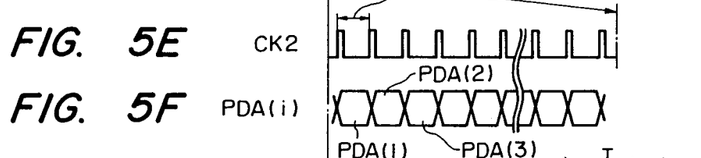
Figure 5G:
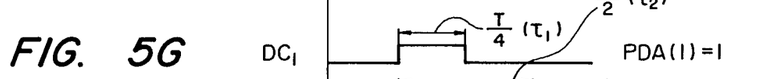
Figure 5H:
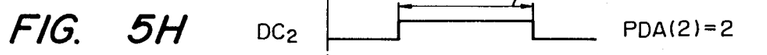
Figure 5I:
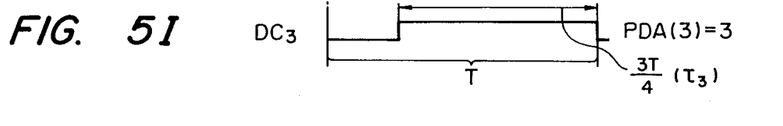

Let T be the period of light irradiation for one line. As shown in FIG. 5A, four clock pulses of the signal CK1 are generated in the period T corresponding to the number of gradations. As shown in FIG. 5B, a clear signal CLR1 becomes "L" in every period T to reset the contents of the m-stage ring counter 12. The count datum TM is incremented from 0 to 3 in every period of T/4 as the clock signal CK1 is counted up. As shown in FIG. 5E, clock signal CK2 pulses of N in number, corresponding to the number of the light-emitting diodes $D_{c1}$ to $D_{cN}$, are generated in the period of T/4 (that is, the clock signal CK2 is generated in the period of T/4N). In other words, as shown in FIG. 5F, all the gradation data PDA(1) to PDA(N) are successively read from the line memory 10 by the address signal $S_N$.

In order to describe the operation of the control circuit in more detail, it is assumed that the gradation data are set to be PDA(1)=1, PDA(2)=2, and PDA(3)3. The count datum TM is made to be "1" in response to the first clock signal CK1, and then the gradation datum PDA(i) successively read in the period of $t_1$ to $t_3$ is compared with the count datum TM. In this period:

PDA(1)=TM

PDA(2)>TM
PDA(3)>TM
Accordingly:
CM(1)=1
CM(2)=1
CM(3)=1

Thus, the data {1, 1, 1, . . .} are stored in the shift register 14, and the data are latched by the latch circuit 15 at a point of time $t_2$.

In the next period of $t_2$ to $t_3$, CM(1)=1, CM(2)=1 and CM(3)=1. Accordingly, the light-emitting diodes $D_{c1}$, $D_{c2}$ and $D_{c3}$ are turned on through the LED driver 16. At the same time, the output TM of the k-stage ring counter 12 becomes "2", so that the gradation datum PD(i) read again in synchronism with the clock signal CK2 is compared with the output TM by the comparator 13. In this condition: PDA(1)<TM, PDA(2)=TM and PDA(3)>TM. Accordingly: CM(1)=0, CM(2)=1 and CM(3)=1. Therefore, the data {0, 1, 1, . . .} are stored in the shift register 14, and the data are latched by the latch circuit 15 at a point of time $t_3$.

In the next period of $t_3$ to $t_4$, CM(1)=0, CM(2)=1 and CM(3)=1. Accordingly, the light-emitting diode $D_{c1}$ is turned off while the light-emitting diodes $D_{c2}$ and $D_{c3}$ continuously emit light. At the same time, the count datum TM becomes "3", and the present gradation datum PD(i) is compared with the count datum TM by the comparator 13. In this condition, PDA(1)<TM, PDA(2)<TM and PDA(3)=TM, and thus CM(1)=0, CM(2)=0 and CM(3)=1. Accordingly, the data {0, 0, 1, . . .} are stored in the shift register 14 and latched by the latch circuit 15 at a point of time $t_4$. In the next period of $t_4$ to $t_5$, the light-emitting diodes $D_{c1}$, $D_{c2}$, $D_{c3}$, . . . are driven based on the data in the same manner as described above.

As the result of the aforementioned processing, the light-emitting diodes $D_{c1}$, $D_{c2}$ and $D_{c3}$ are respectively driven during the periods of T/4, T/2 and 3T/4 corresponding to the gradation data PDA(1), PDA(2) and PDA(3), so that the quantities of light which the diodes emit in a predetermined period T can be respectively determined. Thus, the gradation data are converted into time-width data and the gradation of the light-sensitive material controlled corresponding to the time width.

Although the above description relates to the case where the number of gradations is four, it is general that the number of gradations is $2^k$. In this embodiment, k (number of bits) is set at eight so that 256 gradations can be obtained. In this embodiment, the period T in which one line image is formed by one light-emitting diode array is about 5 msec. Further, a constant driving current is always supplied to the respective light-emitting diodes so that the quantity of light received on the light-sensitive material is proportional to the time width.

As described above, according to this embodiment, the quantity of light received on the light-sensitive material within a predetermined period T is controlled by time width modulation so that high-precision gradation control can be easily attained.

Figure 6:
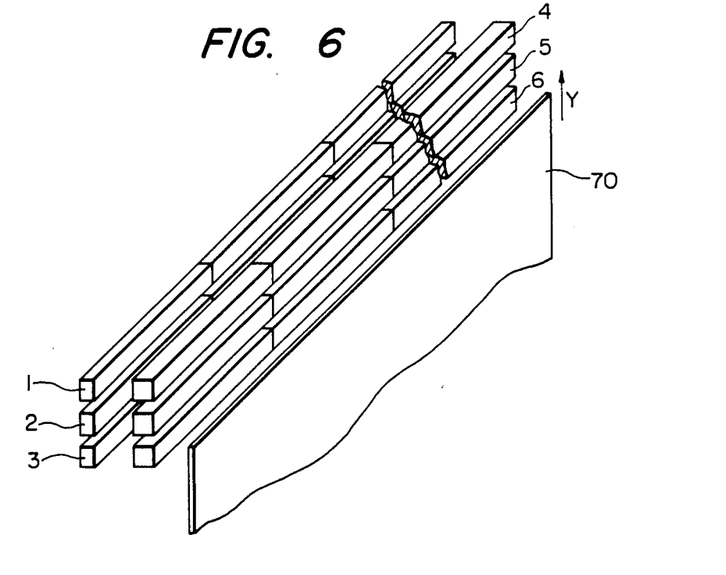
FIG. 6 is a schematic view showing a second embodiment of the inventive image forming apparatus.

FIG. 6 is a schematic view showing a second embodiment using the image forming apparatus shown in FIGS. 3 and 4. In other words, the image forming apparatus as shown in FIGS. 3 and 4 is provided in the form of a single unit. This embodiment provides an enhanced function using a combination of a plurality of units with respect to a light-sensitive material 70 which is relatively large in width.

Because the respective light-emitting diodes constituting each light-emitting diode array are simultaneously controlled by the N bits of data stored in the latch circuit as shown in FIGS. 4 and 5, the synchronizing operation can be easily carried out, even when a plurality of units are used in combination as shown in FIG. 6. Accordingly, differences in operation do not occur. As above, this embodiment is applicable to the case where the light-sensitive material is large in size.

Figure 7:
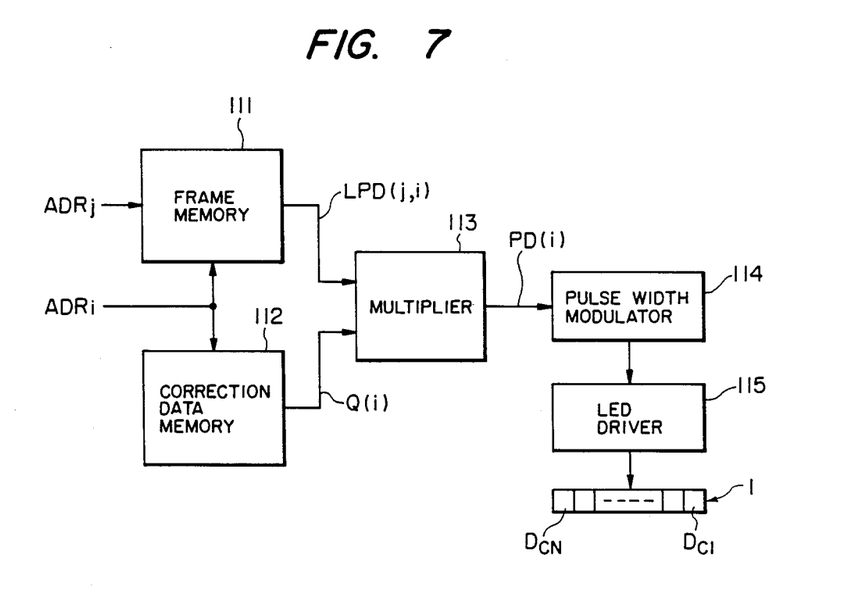
FIG. 7 is a block diagram showing a control circuit used for controlling a light-emitting diode array provided in the image forming apparatus according to a third embodiment of the invention.

FIG. 7 shows a control circuit for controlling the light-emitting operation of the light-emitting diodes in the image forming apparatus according to a third embodiment of the invention. Although FIG. 7 shows the case where one light-emitting diode array is controlled by the control circuit, it is a matter of course that the other light-emitting diode arrays are controlled by a similar circuit.

In FIG. 7, reference numeral 111 designates a frame memory for storing all gradation data, frame by frame. For example, assuming that a one frame image is formed on the light-sensitive material by emitting light in M lines from the N light-emitting diodes $D_{c1}$ to $D_{cN}$, M gradation data, which correspond to one line for the light-emitting diodes $D_{c1}$ to $D_{cN}$, are stored in M address areas. The respective gradation data express $2^k$ gradations formed by k bits of binary-coded data.

Reference numeral 112 designates a correction data storage memory for storing correction data corresponding to the light-emitting intensity of the respective light-emitting diodes $D_{c1}$ to $D_{cN}$ when the supplied current is constant. As described above, in general, the light-emitting diodes are not equal in light-emitting intensity to each other even if the supplied current is constant. For correction of the light-emitting intensities, the respective light-emitting intensities are measured with a predetermined constant current supplied to the light-emitting diodes $D_{c1}$ to $D_{cN}$ with the relative intensities of the light-emitting diodes $D_{c2}$ to $D_{cN}$ being determined with reference to the intensity of the light-emitting diode $D_{c1}$. These relative rates, as correction data corresponding to the light-emitting diodes $D_{c1}$ to $D_{cN}$, are stored in the correction data storage memory 112.

Let j (an integer in a range of 1 to M) be to the line number and i (an integer in a range of 1 to N) be the light-emitting diode number. It is now assumed that the reading of the gradation data LPD(i, j) and the reading of the correction data Q(i) are carried out using address signals $ADR_j$ and $ADR_i$.

Reference numeral 113 designates a multiplier circuit for multiplying the gradation data LPD(i, j), transferred line by line from the frame memory 11, by the correction data Q(i) to thereby generate corrected gradation datum PD(i) represented by the following equations:

$$PD(1) = LPD(j, i) \times Q(1) \qquad (1)$$
$$\vdots$$
$$PD(i) = LPD(j, i) \times Q(i)$$

Reference numeral 114 designates a pulse width modulating circuit for generating a rectangular signal of a time width proportional to the value of the corrected gradation datum PD(i).

Reference numeral 115 designates a driving circuit for driving the light-emitting diodes $D_{c1}$ to $D_{cN}$ with the light-emitting time determined correspondingly to the time width determined by the rectangular signal. In this embodiment, a constant current is supplied to the respective light-emitting diodes $D_{c1}$ to $D_{cN}$, and the respective quantities of light emitted by the diodes are determined by time-width modulation, as described above.

Figure 8:
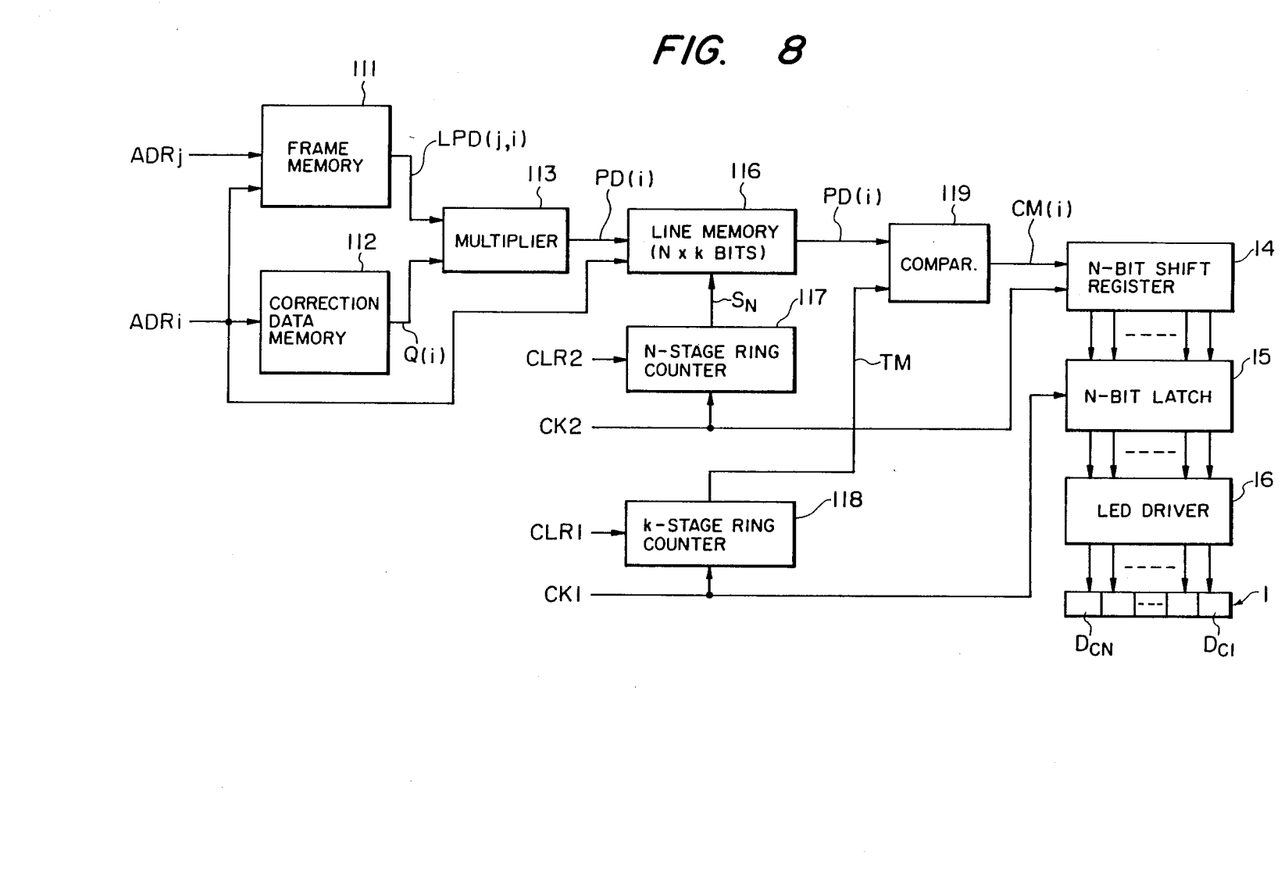
FIG. 8 is a block diagram showing a typical example of a control circuit depicted in FIG. 7.
Figure 9A:
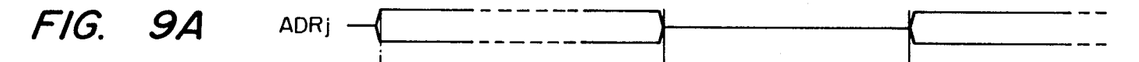
FIGS. 9A to 9K are a timing chart for explaining the operation of the control circuit depicted in FIG. 8.
Figures 9B, 9C:
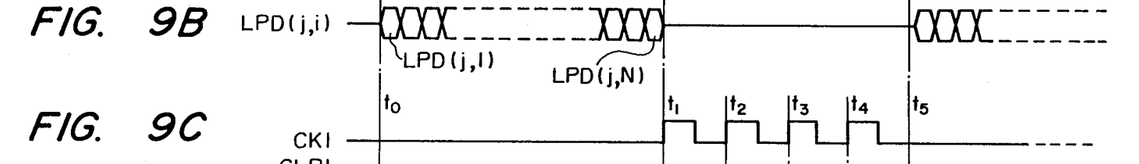
Figure 9D:
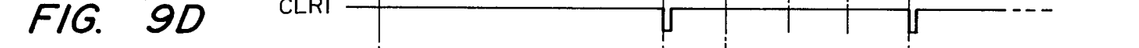
Figure 9E:
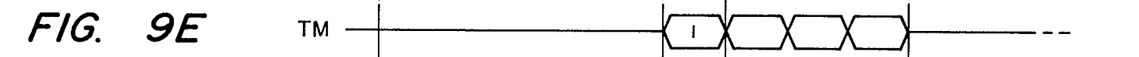
Figure 9F:
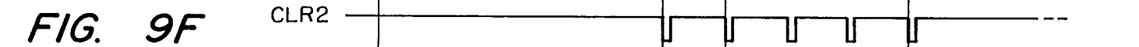
Figure 9G:
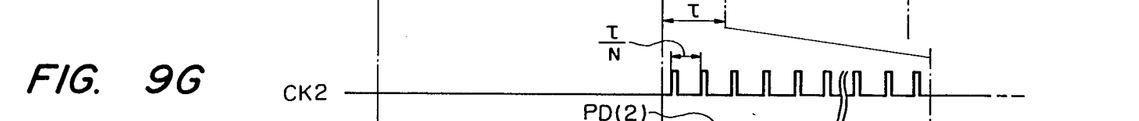
Figure 9H:
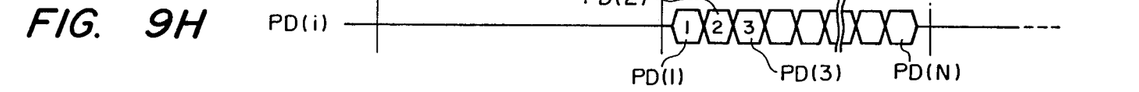
Figure 9I:
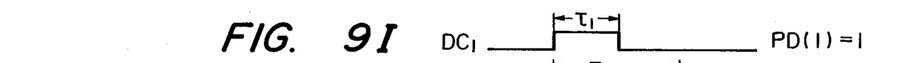
Figure 9J:
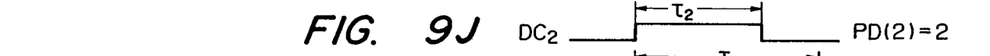
Figure 9K:
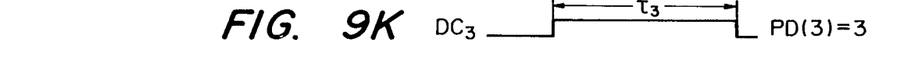

FIG. 8 is a block diagram showing in more detail the construction of the pulse width modulating circuit 114, the driving circuit 115, etc., depicted in FIG. 7. In FIG. 8, the pulse width modulating circuit 114 is formed by a line memory 116, an N-stage ring counter 117, a k-stage ring counter 118 and a comparator 119, and the driving circuit 115 is made up of a shift register 14, a latch circuit 15 and LED driver 16.

The line memory 116 has storage addresses, which are N in number, each capable of storing k bits so that one line of gradation datum PD(i) sent from the multiplier circuit 113 can be temporarily stored. The N-stage ring counter 117 is provided to count pulses of a clock signal CK2 having a predetermined period and to feed count data $S_N$, as an address signal, to the line memory 116 to thereby read the gradation datum PD(i) from the designated address i to thus apply the gradation datum PD(i) to the comparator 119. The k-stage ring counter 118 is provided to count pulses of a clock signal CK1 having a predetermined period and to apply count datum TM to one input terminal of the comparator 119 so that the count data can be compared with the gradation datum PD(i) by the comparator 119. In this condition, the period of the clock signal CK2 is set to 1/N times as long as the period of the clock signal CK1, in other words, the period of the clock signal CK1 is made several-tenths as long as the period of the outputs of the light-emitting diodes $D_{c1}$ to $D_{cN}$. The comparator 119 compares the gradation datum PD(i) with the count datum TM. When PD(i)≧TM, a logical output DM(i) of "1" is generated by the comparator 119, and on the contrary, if PD(i)<TM, a logical output DM(i) of "0" is generated.

The shift register 14, the latch circuit 15 and the LED driver 16 in the succeeding stage operate in the same manner as described above with respect to the first embodiment as shown in FIG. 4, and therefore a further description will be omitted with respect to those components.

In the following, the operation of the aforementioned control circuit is described with reference to the timing chart of FIG. 9.

In the period of $t_0$ to $t_1$, an address signal $ADR_j$ for designating the line number is applied to the frame memory 111, and at the same time, an address signal $ADR_i$ designating the order of the light-emitting diodes $D_{c1}$ to $D_{cN}$ is applied both to the frame memory 111 and to the correction data storage memory 112. The gradation datum LPD(J, i) of the thus-designated line number and the correction datum Q(i) are read from the memories and the aforementioned equations are computed by the multiplier circuit 113. The storage of the corrected gradation data PD(1) to PD(N) in the line memory 116 is completed at a point of time $t_1$.

Except for the aforementioned operation the control circuit operates in the same manner as described above with reference to FIG. 5, and therefore a further description will be omitted.

As described above, according to the third embodiment, the gradation data LPD(j, i) are corrected by the correction data Q(i), even if variations exist in the output light-emitting intensities of the light-emitting diodes when a constant current is supplied to the diodes. Accordingly, the light-emitting diodes are driven in a time-width modulation manner with the light-emitting time periods corresponding to the value of the corrected gradation datum PD(i). Accordingly, the respective quantities of light emitted by the light-emitting diodes are constant for all gradations. Thus, the variations in the characteristics of the light-emitting diodes are corrected for.

As described above, according to the third embodiment, the variations in the characteristic of the light-emitting diodes are corrected for by the correction data without performing complex processing such as adjustment of resistance values or the like, as required in the prior art. Particularly, this embodiment is effective in the case where the light-emitting diodes are large in number. Accordingly, the third embodiment is suited for the formation of high-resolution image.

Figure 10:
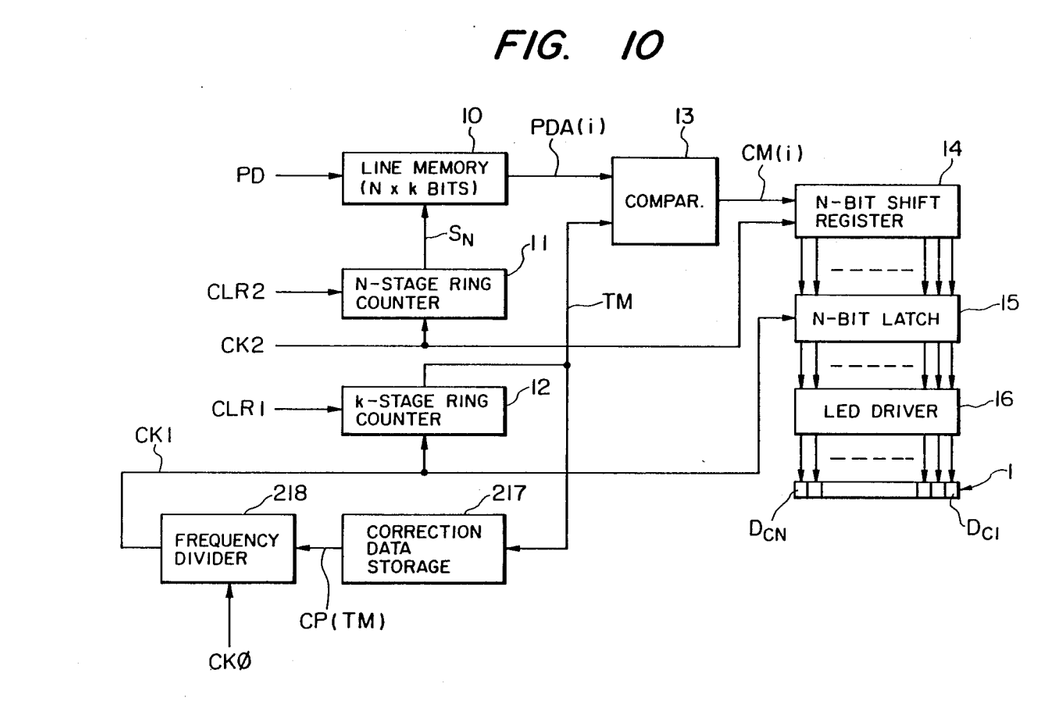
FIG. 10 is a block diagram showing a control circuit for controlling a light-emitting diode array provided in the image forming apparatus according to a fourth embodiment of the invention.

FIG. 10 is a block diagram of the image forming apparatus according to a fourth embodiment of the invention. Like reference numerals in each of FIGS. 4 and 10 designate like parts.

In FIG. 10, reference numeral 217 designates a correction data storage unit for feeding out correction data CP(TM) stored in the address designated by the count datum TM sent from the k-ary ring counter 12. In short, correction data, $2^k$ in number, are preliminarily stored in $2^k$ addresses of the storage 217.

Reference numeral 218 designates a frequency divider for dividing the reference clock signal CK$\phi$ of a predetermined frequency by a division factor designated by the correction data CP(TM) to thereby generate a clock signal CK1 having a period designated by the correction data CP(TM). That is, the period of the clock signal CK1 changes corresponding to the count datum TM representing a gradation.

Other parts operate in the same manner as described above with respect to the first embodiment, and therefore a further description of such parts will be omitted.

In this embodiment, the quantity of light received on the light-sensitive material from the light-emitting diodes is not always proportional to the gradation determined corresponding to the quantity of light received on the light-sensitive material. Therefore, correction should be made in this embodiment.

More particularly, the period of the clock signal CK1 is changed by the frequency divider 218 in accordance with the correction data which are preliminarily stored in the correction data storage 217 to thereby control the light-emitting time for each gradation. For example, the respective amounts of time $\tau_1$, $\tau_2$ and $\tau_1$ are changed suitably to control the quantities of light emitted by the light-emitting diodes.

Figure 11:
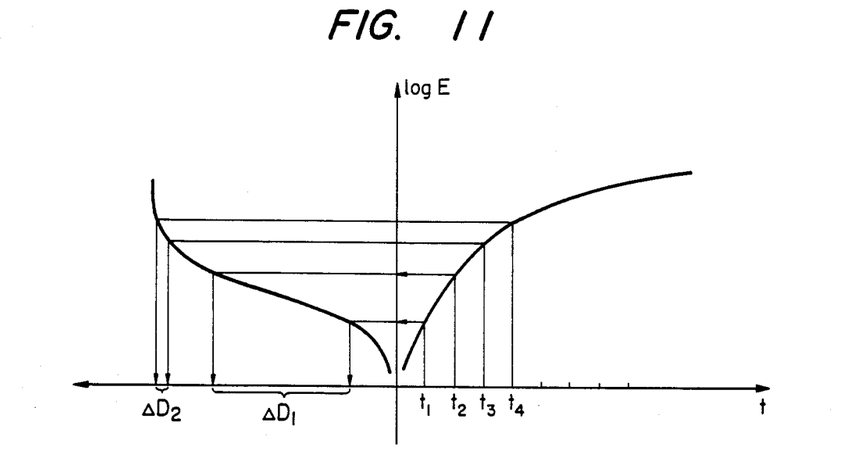
FIGS. 11 and 12 are explanatory views used for explaining the theory of the invention for correcting the light-emitting time period the light-emitting diodes corresponding to the concentration characteristics of the light-sensitive material.

The theory of this correction method is described with reference to FIGS. 11 and 12. FIG. 11 is a graph of a characteristic curve showing the relation between the quantity of light received on the light-sensitive material and the actual exposure level resulting therefrom. In the first quadrant of the graph is the quantity E of light emitted by a light-emitting diode emits versus time. In the second quadrant of the graph is plotted the exposure level of the light-sensitive material which results for the quantity E of light. In this graph, the quantity E of light is plotted logarithmical, and the light-emitting times $t_1$, $t_2$, $t_3$ and $t_4$ are at equal intervals. The quantity E of light changes proportionally to the light-emitting time. However, the exposure level of the light-sensitive material does not always change proportionally to the quantity E of light. In other words, the exposure level of the light sensitive material (represented by $\Delta D_1$ and $\Delta D_2$) is not the same for all light-emitting time periods), even though the quantity E of light changes proportionally. If the change of concentration is large, as in the case of $\Delta D_1$, gradation gaps can be recognized by the human eye. Hence, an excellent image quality cannot be obtained.

Figure 12:
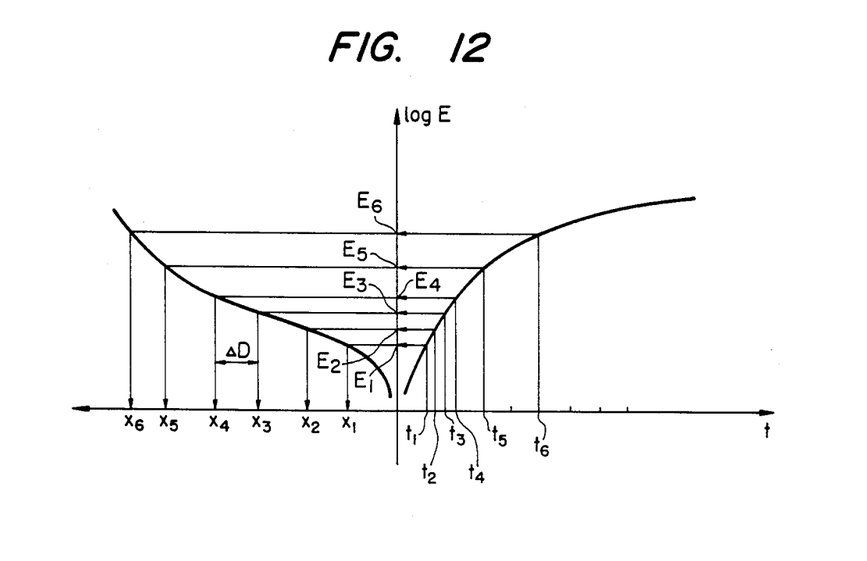

FIG. 12 illustrates the application of the inventive correction method so as to solve the above problem. At first, the change $\Delta D$ of concentration determined by the reciprocal of the number of gradations (that is, $\frac{1}{2^k}$) is determined. The quantities $E_1$, $E_2$, $E_3$, $E_4$, $E_5$, ... of light are measured corresponding to the amounts $X_1$, $X_2$, $X_3$, $X_4$, $X_5$, ... of exposure for every change $\Delta D$. Further, the light-emitting times $t_1$, $t_2$, $t_3$, $t_4$, $t_5$, ... required for obtaining the respective quantities of light are measured. Correction data CP(1), CP(2), CP(3) ... corresponding to the light-emitting times $t_1$, $t_2$, $t_3$... are preliminarily stored in the correction data storage 217. These correction data CP(1) to CP($2^k$) are stored in predetermined address areas in the order of increasing exposure levels so that correction data CP(TM) designated by the count datum TM from the h-stage ring counter 12 can be read out. Further, the period of the clock signal CK1 is changed by changing the division ratio of the reference clock signal $\phi$ divided by the frequency divider 218 based on the correction data CP(TM), thereby obtaining characteristics as shown in FIG. 12.

Although a control method has been described in which a constant change $\Delta D$ of exposure level is employed, it is to be understood that the change of exposure level need not always be constant and that nonconstant values may be employed as long as the gradation gaps cannot be recognized by the human eye.

As described above, according to this embodiment, the light-emitting time is controlled corresponding to the exposure characteristics of the light-sensitive material while the respective light-emitting diodes in the light-emitting diode array are maintained at a constant light-emitting intensity. Accordingly, highly precise gradation control can be achieved.

As described above, according to the present invention, in an image forming method for forming an image on a light-sensitive material by the use of a light-emitting diode arrays as a light source, the quantity of light received on the light-sensitive material in a predetermined period is controlled by changing the light-emitting time of the light-emitting diodes, the output light intensity of which is held constant. Accordingly, high-precision gradation control can be attained. Further, according to the inventive method, because the respective light-emitting diodes in the light-emitting diode array are maintained at equal light intensities, adjustment can be easily made regardless of the light intensity characteristics which depend on the currents supplied to the respective light-emitting diodes.

Further, according to the invention, in an image forming method in which gradation control is effected by changing the current supply time correspondingly to the gradation level while a constant current is supplied to the light-emitting diodes in the light-emitting diode array, the current supply time is corrected at every gradation level in accordance with the relative variations in light intensity of the respective light-emitting diodes when constant current is supplied. Accordingly, the quantities of light emitted by the light-emitting diodes can be made uniform at every gradation in spite of the variations in light intensity output of the light-emitting diodes, thereby attaining high-precision gradation control.

Furthermore, according to the image forming method of the invention, in an image forming method for forming image on a light-sensitive material by the use of respective light-emitting diodes in light-emitting diode arrays as a light source, the light-emitting time is controlled to make the exposure level changes of the light-sensitive material constant or unrecognizable by the human eye by changing the light-emitting times corresponding to the gradation data. Accordingly, high-precision gradation control is achieved compared with the prior art in which half-tone gradation is attained by controlling the light-emitting intensities of the light-emitting diodes. In addition, when the exposure level change of the light-sensitive material is constant, the gradation is excellent in linearity, thereby attaining an excellent image.

What is claimed is:

1. In a method for forming an image on a light-sensitive material by controlling a quantity of light received on a light-sensitive material by gradation-controlling a light-emitting diode array, the improvement comprising: establishing light-emitting intensities of diodes constituting said light-emitting diode array at a constant level, and controlling a quantity of light received on said light-sensitive material in a predetermined period by changing light-emitting periods of time of the respective light-emitting diodes correspondingly to recording gradation data, in which the light-emitting diode array is composed of a plurality of light-emitting diodes which are N in number, and in which an image having $2^k$ gradations is recorded on said light-sensitive material by provision of: an m-stage ring counter for counting pulses of a first clock signal of a predetermined frequency to divide a period T for deriving each of the N light-emitting diodes by $2^k$; an N-stage ring counter for counting pulses of a second clock signal of a predetermined frequency; a line memory of N×k bits receiving an output of the N-stage ring counter as an address signal; a comparator for comparing image data produced by said line memory with an output of said m-stage ring counter to thereby produce binary-coded data; a shift register of N bits receiving the binary-coded data in synchronism with said second clock signal; and a driving circuit for transferring in parallel an output of said N-bit shift register to said light-emitting diodes to drive the latter.

2. The image forming method according to claim 1, in which a plurality of light-emitting diode arrays are arranged serially in a longitudinal direction.

3. The image forming method according to claim 1, in which a plurality of light-emitting diode arrays are arranged serially in a longitudinal direction.

* * * * *